US008934461B2

(12) United States Patent
Leis et al.

(10) Patent No.: US 8,934,461 B2
(45) Date of Patent: Jan. 13, 2015

(54) METHOD FOR RE-ASSIGNMENT OF S-CSCF SERVICES TO REGISTERED IMS USERS OF A HOME SUBSCRIBER SERVERS HSS

(75) Inventors: Peter Leis, Penzberg (DE); Jiadong Shen, München (DE); Ulrich Wiehe, Bad Hersfeld (DE)

(73) Assignee: Nokia Solutions and Networks GmbH & Co. KG, Munich (DE)

(*) Notice: Subject to any disclaimer, the term of this patent is extended or adjusted under 35 U.S.C. 154(b) by 550 days.

(21) Appl. No.: 12/312,043

(22) PCT Filed: Oct. 17, 2007

(86) PCT No.: PCT/EP2007/061111
§ 371 (c)(1),
(2), (4) Date: Apr. 23, 2009

(87) PCT Pub. No.: WO2008/049774
PCT Pub. Date: May 2, 2008

(65) Prior Publication Data
US 2010/0062767 A1  Mar. 11, 2010

(30) Foreign Application Priority Data
Oct. 24, 2006 (EP) .................................. 06022238

(51) Int. Cl.
*H04W 8/04* (2009.01)
*H04L 29/06* (2006.01)
*H04L 29/14* (2006.01)

(52) U.S. Cl.
CPC ............ *H04L 65/1016* (2013.01); *H04L 69/40* (2013.01); *H04W 8/04* (2013.01)
USPC ...... 370/338; 370/384; 455/432.3; 455/435.1

(58) Field of Classification Search
USPC ............... 370/338, 352, 384, 401; 455/432.3, 455/435.1
See application file for complete search history.

(56) References Cited

U.S. PATENT DOCUMENTS

| 2002/0128008 A1* | 9/2002 | Phan-Anh et al. ............. 455/424 |
| 2005/0060411 A1* | 3/2005 | Coulombe et al. ............. 709/227 |
| 2005/0065801 A1* | 3/2005 | Poikselka et al. ................. 705/1 |

(Continued)

FOREIGN PATENT DOCUMENTS

CN            1773934         5/2006

OTHER PUBLICATIONS

Huawei, "C4-071026: Discussion ofn the failure of the S-CSCF", 3GPP TSG CT WG4 meeting 36, Aug. 24, 2007, pp. 1-11.

(Continued)

*Primary Examiner* — Awet Haile
(74) *Attorney, Agent, or Firm* — Squire Patton Boggs (US) LLP (57) ABSTRACT

Re-assigning Serving Call Session Control Function, S-CSCF, services to a user of a Home Subscriber Server, HSS (200), in a Third Generation Partnership Program, 3GPP, telecommunications network is provided. In the case that S-CSCF services to the user including a registration procedure are previously assigned and access by the user to the S-CSCF services is erroneously lost, the proposal is to provide a method and means to re-assign those services. First, dynamic registration information (204) is uploaded from S-CSCF to the HSS (200) during the registration procedure. Then, the dynamic registration information (204) is stored from HSS (200) to S-CSCF (203) during a re-assignment procedure of the user.

14 Claims, 6 Drawing Sheets

(56) References Cited

U.S. PATENT DOCUMENTS

2005/0078642 A1* 4/2005 Mayer et al. ................ 370/338
2008/0090569 A1* 4/2008 Khan et al. ................ 455/435.1
2011/0029689 A1* 2/2011 Darbyshire et al. .......... 709/238

OTHER PUBLICATIONS

Huawei, "Reassignment for S-CSCF during the terminated call procedure, Tdoc S2-060216", 3GPP temporary document, Jan. 16, 2006, pp. 1-2.

Digital cellular telecommunications system (Phase 2+); Universal Mobile Telecommunications System (UMTS); IP Multimedia (IM) Subsystem Cx and Dx Interfaces; Signalling flows and message contents (3GPP TS 29.228 version 7.3.0 Release 7); Sep. 2006, pp. 1-57.

"Digital cellular telecommunications system (Phase 2+); Universal Mobile Telecommunications System (UMTS); IP Multimedia (IM) Subsystem Cx and Dx Interfaces based on the Diameter protocol; Protocol details (3GPP TS 29.229 version 7.3.0 Release 7); ETSI TS 129 229", Sep. 2006, pp. 1-27.

Huawei; "Reassignment of S-CSCF During Terminating Call Procedure"; XP002430231; pp. 1 & 2; Oct. 31-Nov. 4, 2005.

Packetcable 2.0; "SIP Signaling Technical Report"; XP002430233; pp. 1-38; Oct. 13, 2006.

3GPP TS 24.229 V7.5.1 (Oct. 2006), Technical Specification, 3rd Generation Partnership Project, Technical Specification Group Core Network and Terminals; IP multimedia call control protocol based on Session Initiation Protocol (SIP) and Session Description Protocol (SDP); Stage 3 (Release 7).

3GPP TS 23.228 V7.5.0 (Sep. 2006), Technical Specification 3rd Generation Partnership Project; Technical Specification Group Services and System Aspects; IP Multimedia Subsystem (IMS); Stage 2 (Release 7).

* cited by examiner

FIG 3

① Cx-SAR Request (User ID, Unregistered)

② Cx-SAA Response (User Profile, Registration Information)

FIG 4

① SIP SUBSCRIBE Request (User ID)

② 200 OK (Service-Route)

FIG 7

METHOD FOR RE-ASSIGNMENT OF S-CSCF SERVICES TO REGISTERED IMS USERS OF A HOME SUBSCRIBER SERVERS HSS

Within the IM CN subsystem IMS as defined by 3GPP the so called Serving Session Control Function S-CSCF is the central point to users that are hosted by this S-CSCF. According to 3GPP TS 23.228 the S-CSCF provides these services to registered and unregistered users when it is assigned to these users. This assignment is stored in the Home Subscriber Server HSS.

Though mechanisms at the network element layer, such as a cluster solution, could be used to improve the reliability of the S-CSCF, it is necessary to have a failover mechanism at the network layer to ensure the availability of the network. Thus, S-CSCF re-assignment is made possible.

Figure 1:
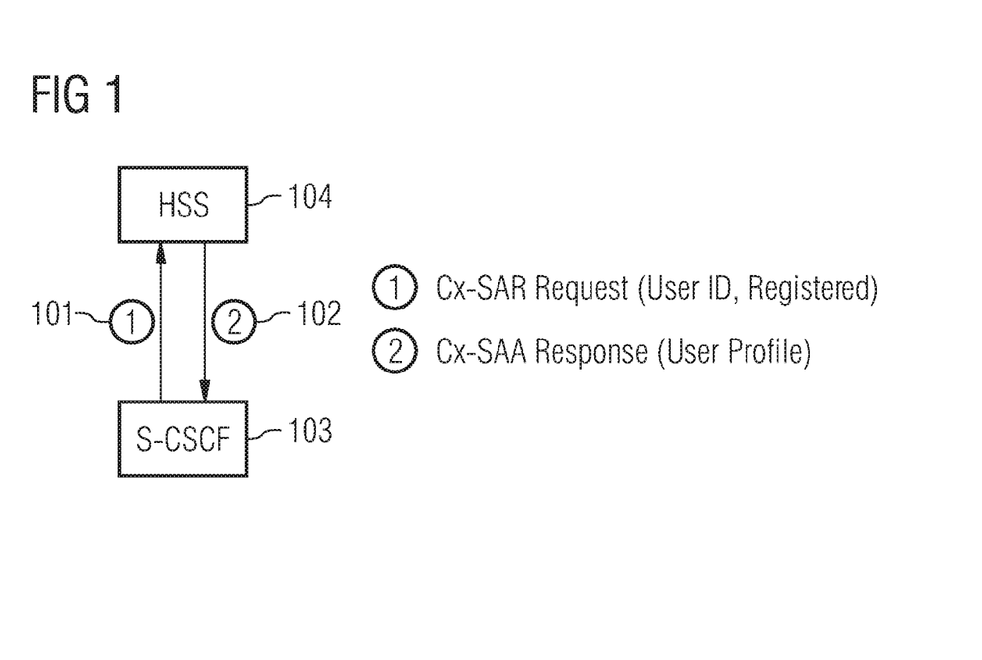
FIG. 1 illustrates the prior art.

The situation is shown in FIG. 1. For registered users, the assignment of the S-CSCF normally occurs when an IMS user tries to register with the IMS via sending a SIP REGISTER request to the S-CSCF. First, a temporary assignment is created via Cx-MAR/MAA operation during the authentication procedure within the registration procedure.

After successful authentication, the S-CSCF 103 treats the IMS user as a registered user and confirms the S-CSCF assignment via a Cx-SAR/SAA operation 101, 102 to an HSS 104.

Otherwise in case of authentication failure, the temporary assignment is removed via a Cx-SAR/SAA operation.

Problematically, in 3GPP TS 23.228 an S-CSCF re-assignment for a registered user is only possible when the next registration procedure (via Cx-MAR/MAA operation) occurs. However, an S-CSCF re-assignment by a non-REGISTER request via Cx-SAR/SAA operation is not possible according to the standard.

As a result, when the currently assigned S-CSCF is not available for a registered user, temporarily or permanently, no service can be provided for this registered user until the next registration procedure.

It has been previously proposed to piecewise solve this problem. This problem could be limited, for example, to a certain scale if the registration timer for re-registration is set to a very small value. But this cannot solve the problem. After an S-CSCF failure, no service can be provided before the next re-registration. At any rate, having a very short re-registration timer would increase the traffic on the air interface, which is clearly disadvantageous.

The idea of this proposal is i) to upload dynamic registration information from S-CSCF to HSS during registration procedure; ii) to download the stored dynamic registration information from HSS to S-CSCF during re-assignment procedure; iii) provide the re-assignment information to the P-CSCF, which acts as the outbound proxy for a IMS terminal.

Dynamic registration information is the information created during the registration procedure. In normal practice, this includes basically the binding address, binding duration, path header value, etc. However, dynamic information can be extended in future, it is possible that depending on the recovery concept of the CSCF part or whole information created during the registration procedure are uploaded in HSS, e.g. binding address (contact header), binding duration (expires header/parameter), path header, etc.

The information is dynamic because they are not statically configured at CSCF. They are generated when a terminal registers with IMS. Lots of the values are provided by the clients or other IMS NEs like P-CSCF, e.g. binding address or Path header value.

The basic idea of the invention for registered users is to upload all necessary information in HSS, which are not statically configured in CSCF/HSS and needed for a proper recovery of CSCF. Since HSS is a database application, the HSS has non-volatile memory any way. With this invention, it is not necessary anymore to use non-volatile memory in CSCF to store such information for a possible recovery.

The following advantages are provided by the proposal described:
  an automatic mechanism of S-CSCF failover can be provided to registered IMS users. No involvement of service staff of operators is required. Therefore no additional OPEX will be generated.
  The failover procedure only takes place when a request for a registered IMS user arrives. This can avoid a possible overload situation at the HSS caused by the administrative removal of the S-CSCF, where a flood of requests will be sent from the HSS to the previously assigned S-CSCF to remove the assignment.
  the existing Cx-SAR/SAA and Cx-LIR/LIA operations and the procedure of the subscription for Reg Event package are re-used with extensions. This will only cause limited impact on the existing specification/implementations.
  The proposal is easily to be verified by checking the Cx-SAR/SAA and Cx-LIR/LIA message and SIP SUBSCRIBE/NOTIFY request/response for Reg Event package.

The specification shall make reference to the following abbreviations.
CSCF Call Session Control Function
S-CSCF Serving CSCF
P-CSCF Proxy CSCF
I-CSCF Interrogating CSCF
HSS Home Subscriber Server
IMS IP Multimedia Subsystem
3GPP 3rd Generation Partnership Project
LIR Location Information Request
LIA Location Information Answer
SAR Server Assignment Request
SAA Server Assignment Answer
RTR Registration Termination Request
RTA Registration Termination Answer
PPR Push Profile Request
PPA Push Profile Answer
PSI Public Service Identity
AS Application Server Now the present invention will be described in more detail with reference to FIG. 2.

Figure 2:
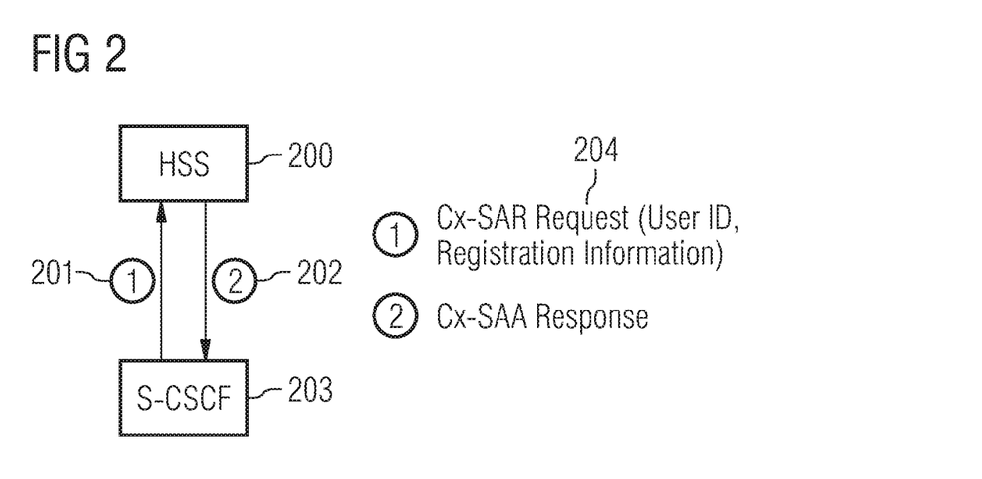
FIG. 2 illustrates inserting the dynamic information in the Cx-SAR Request according to the invention.

The first step is to Upload dynamic registration information to HSS via Cx-SAR/SAA operation. By requesting a user profile via a Cx-SAR request 201 to the HSS 200, the S-CSCF 203 shall also include the dynamic registration information 204 in the request.

This is different to the current procedures as described in 3GPP TS 23.228 where no dynamic registration information can be uploaded to HSS via the Cx-SAR request. In addition, every new Cx-SAR request will cause the dynamic registration information stored at the HSS to be updated. If no dynamic registration information is contained at a Cx-SAR request, the existing one stored at the HSS shall be deleted.

Figure 3:
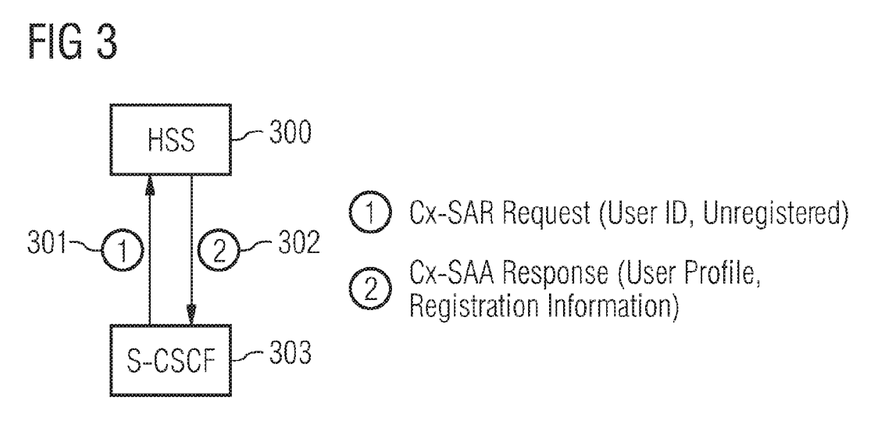
FIG. 3 illustrates the situation where the user is unregistered.

Next, the S-CSCF reassignment for registered IMS users via the extended Cx-SAR/SAA operation as shown in FIG. 3.

When a new S-CSCF 303 is selected and receives a non-REGISTER request 301 for an unknown IMS user, the S-CSCF 303 will treat the user as an unregistered user and will try to download user profile from the HSS 300 via Cx-SAR request 301, according to current IMS specification.

The HSS shall check whether the registration status of the IMS user at the HSS is "registered". If it is the case, but in the Cx-SAR request the user is marked as "unregistered", the HSS can recognize the inconsistence between the HSS and the S-CSCF about the registration status of the IMS user. It shall then check whether dynamic registration information is stored at the HSS for this user. If it is the case, the HSS shall further treat the IMS user as "registered" and provide the stored registration information to the S-CSCF in the Cx-SAA response 302, together with the user profile.

If it is not the case, the HSS shall treat the user as "unregistered" and only provide the user profile to the S-CSCF. And when the S-CSCF receives the dynamic registration information from the HSS, it knows that the user was already registered in IMS. Hence, the S-CSCF shall treat the IMS user as "registered" and build all necessary information for serving a registered IMS user from the received dynamic registration information.

Figure 4:
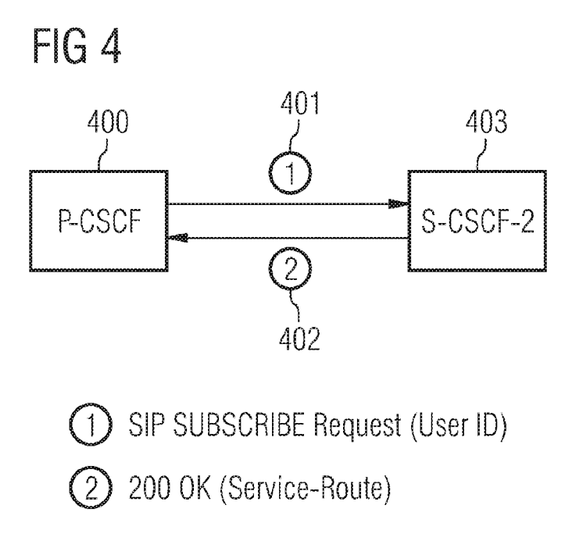
FIG. 4 illustrates the P-CSCF SIP subscribe request.

Providing the S-CSCF assignment information to the P-CSCF via the extended procedure for the subscription of a Reg Event package will now be described with reference to FIG. 4.

A user registered with the IMS user always accesses the IMS via a P-CSCF 400, which acts as an outbound proxy. In order to be capable of providing IMS services for the IMS user the P-CSCF 400 must be aware of the S-CSCF re-assignment. This is because it needs to know the so called Service Route information which points to the next hop, i.e. the S-CSCF 403. 3GPP TS 23.228 that the P-CSCF 400 gets this information based on the SIP the registration procedure, i.e. via Service-Route header contained in the 200 OK to the SIP REGISTER request.

Therefore it is suggested in this proposal to define an additional procedure to inform the P-CSCF about the Service Route information. It is proposed to extend the existing procedure for the subscription to the Reg Event package to provide the S-CSCF re-assignment information (e.g. Service-Route header) to the P-CSCF.

When the P-CSCF recognizes that the previously assigned S-CSCF for an IMS user has been changed (e.g. a terminating request is sent by a different S-CSCF as the assigned one, or the previously assigned S-CSCF does not react to an originating request sent by the P-CSCF), the P-CSCF shall subscribe to the Reg-Event Package or any other suitable event package for the IMS user again (Whether or not the Reg-Event Package is suitable for this procedure is out of scope of the patent).

The P-CSCF 400 shall send a SIP SUBSCRIBE request 401 to the I-CSCF which then forwards the SIP SUBSCRIBE request to the newly selected S-CSCF 403 (e.g. S-CSCF-2). The S-CSCF-2 shall then provide the S-CSCF assignment information 402 to the P-CSCF (whether the information shall be contained in the 200 response to the SUBSCRIBE request or the body of the following NOTIFY request sent from the S-CSCF-2 to the P-CSCF is out of scope of this patent). The P-CSCF shall then update its stored S-CSCF assignment information. With this updated S-CSCF assignment information, the P-CSCF is able to connect the IMS user with the newly assigned S-CSCF.

The proposal suggested here may also be used together with the S-CSCF re-selection procedure for unregistered user.

In the following it is described how an originating request (see FIGS. 5&6) or a terminating request (see FIGS. 7&8) for a registered user can be delivered when the previously assigned S-CSCF is not available.

Figure 5:
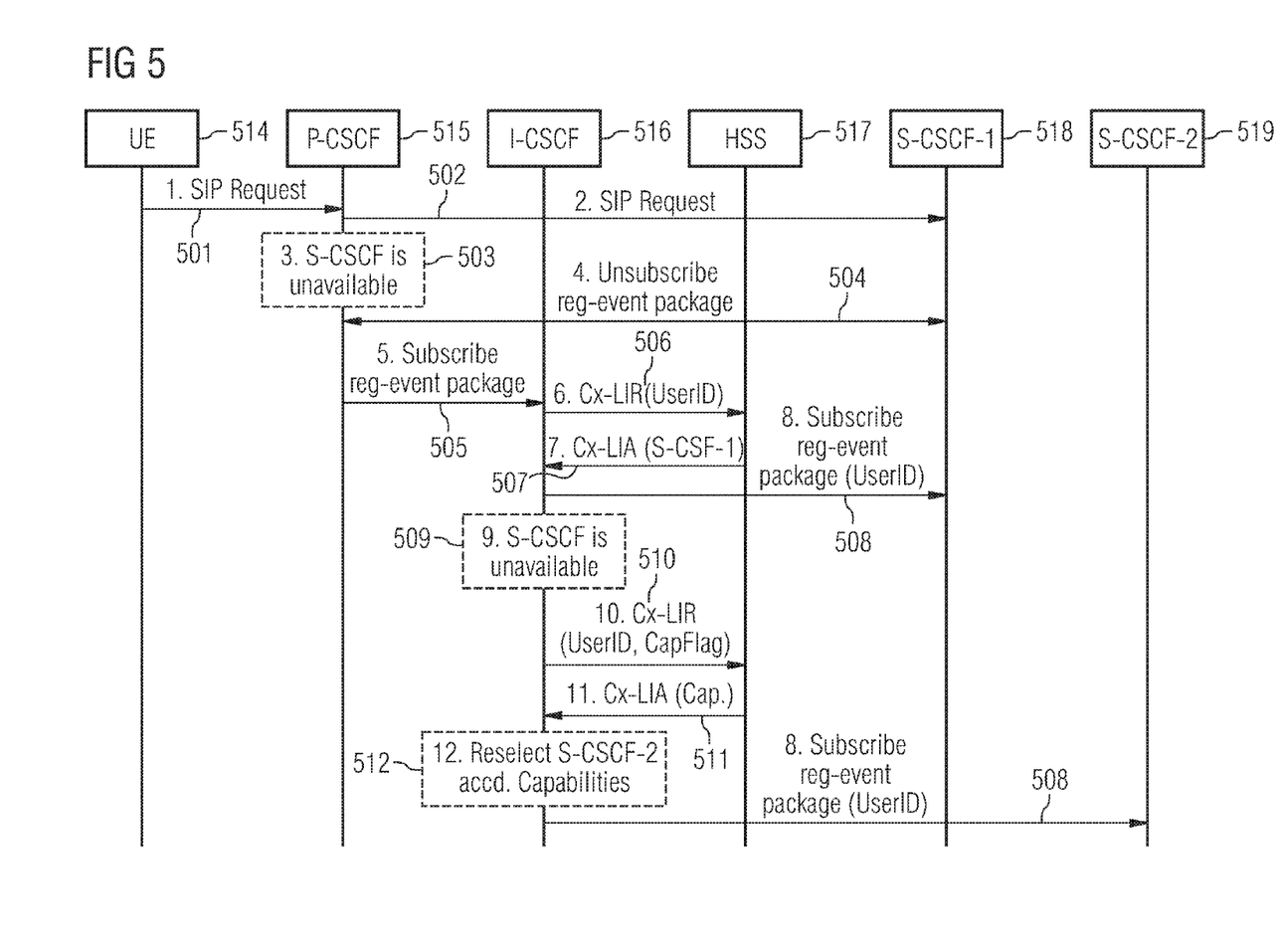
FIGS. 5 and 6 illustrate an originating request for a registered user/unregistered user can be delivered when the previously assigned S-CSCF is not available.

In FIG. 5, a UE 514 sends an SIP Request 501 to the P-CSCF 515, which in turn sends an SIP request 502 to the S-CSCF-1. 503 indicates that an S-CSCF is unavailable and an unsubscribe Reg-Event package 504 is initiated to the S-CSCF-1 518. A subscribe Re-Event package is forwarded between the P-CSCF 5125 and the I-CSCF 516, which in turn sends an Cx-LIR (UserID) 506 to the HSS 517. The HSS 517, in response, sends an Cx-LIA (S.CSCF-1) message 507 back to the I-CSCF 516, which in turn sends a subscribe reg-Event package (UserID) message 508 to the S-CSCF-1 518. 509 indicates that the S-CSCG-1 is unavailable and a Cx-LIR (UserID, CapFlag) message 510 is sent to the HSS 517. The Hss 517 sends a Cx-LIA (Cap.) 511 to the I-CSCF 516. 512 indicates that the S-CSCF-2 is re-selected according to capabilities and the subscribe Reg-Event package (UserID) 508 is sent to the S-CSCF 519.

Figure 6:
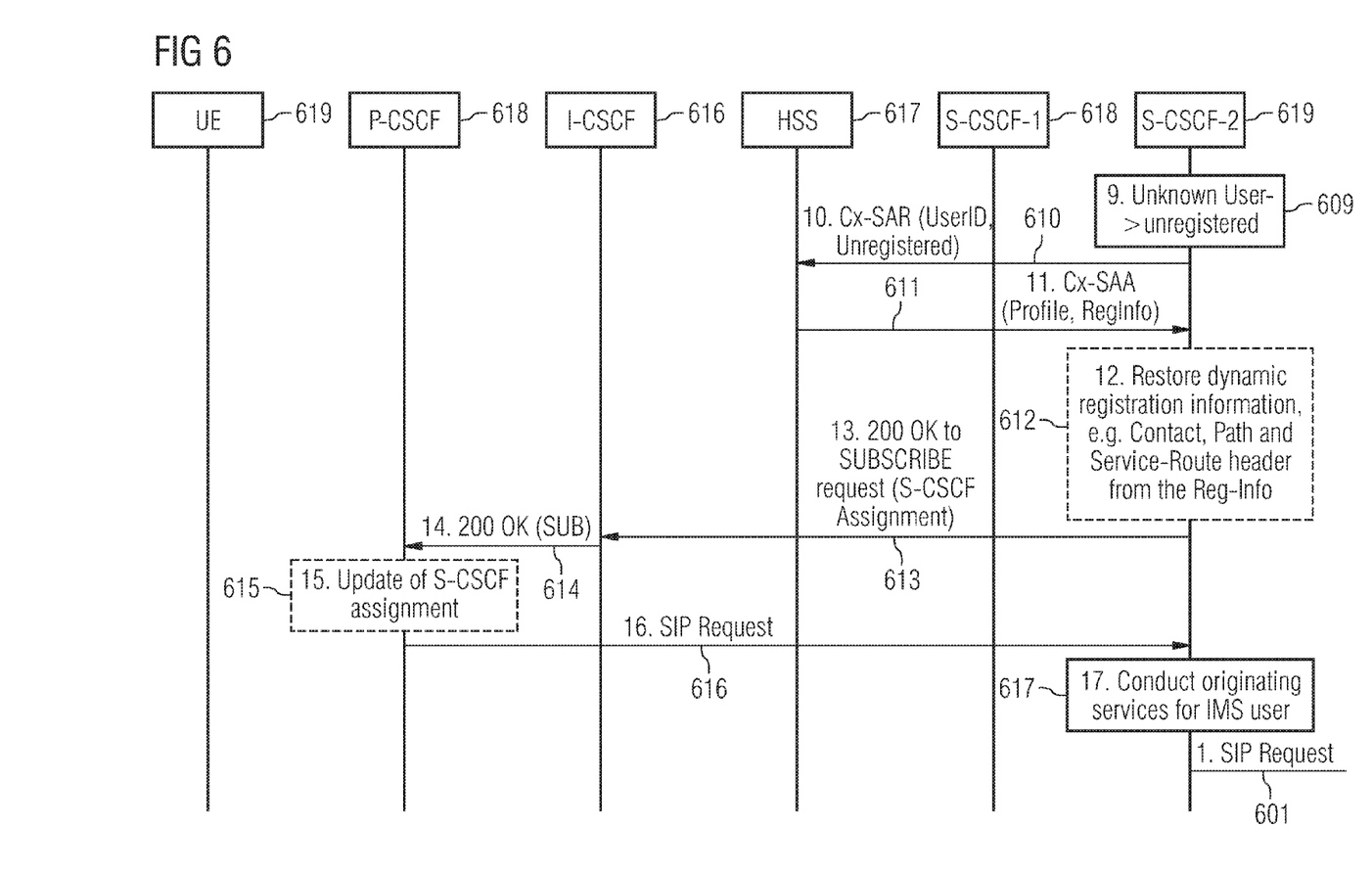

In FIG. 6, after an initial SIP request 601, it is discovered that the exists an unknown User that is unregistered 609. The S-CSF-2 619 sends Cx-SAR (UserID, Unregistered) message 610 to the HSS 617, which in turn sends an Cx-SAA (Profile, RegInfo) message 611 to the S-CSCF-2 619. 612 indicates that the dynamic registration information is to be restored and an OK to Subscribe request (S-CSCF Assignment) message 613 is sent to the I-CSCF 616, which in turn sends an OK (SUB) message 614 to the P-CSCF 618. 615 indicates that there is an update of an S-CSCF assignment and an SIP request 616 is sent to the S-CSCF-2. At which point originating services for IMS User are conducted as indicated by 617.

Figure 7:
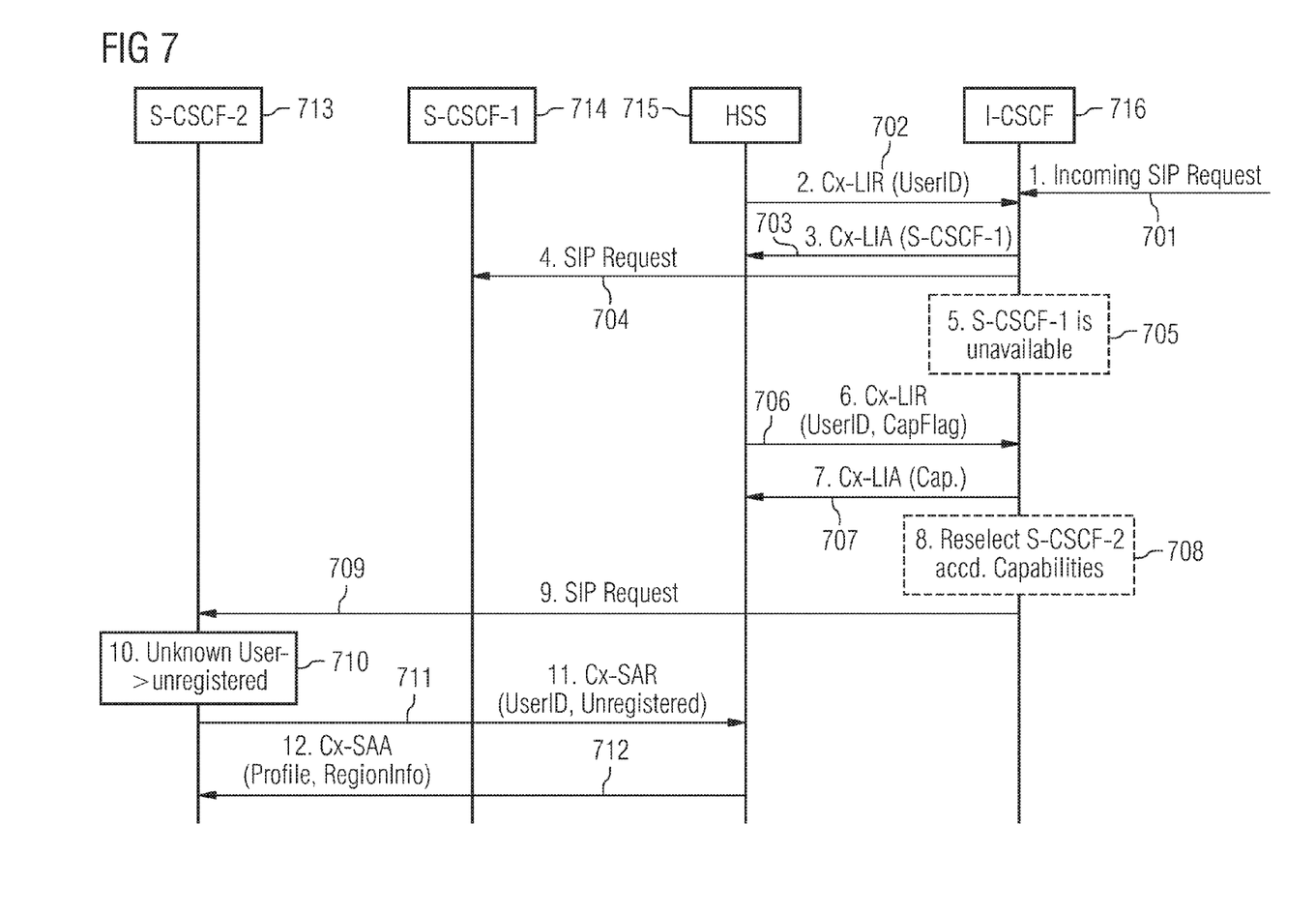
FIGS. 7 and 8 illustrate a terminating request for a registered user/unregistered user can be delivered when the previously assigned S-CSCF is not available.

In FIG. 7, an incoming SIP Request 701 is received by the I-CSCF 716 and the HSS 715 sends an Cx-LIR (UserID) message 702 to the I-CSCF 716. In return, a Cx-LIA message 703 is sent to the HSS 715 and an SIP Request 704 is sent to the S-CSCF-1 714. 705 indicates that the S-CSCF-1 is unavailable and the HSS 715 sends an Cx-LIR (UserID, CapFlag) 706 to the I-CSCF 716, which in turn sends a Cx-LIA (Cap.) message 707 to the HSS 715. 708 indicates that the S-CSCF-2 is reselected according to its capabilities and the I-CSCF 716 sends an SIP Request 709 to the S-CSCF-2 713. 710 indicates an unknown user is unregistered and the S-CSCF 2 713 sends an Cx-SAR (UserID, Unregistered) message 711 to the HSS 715, which in turn returns an Cx-SAA (Profile, RegInfo) message 712 to the S-CSCF-2 713.

Figure 8:
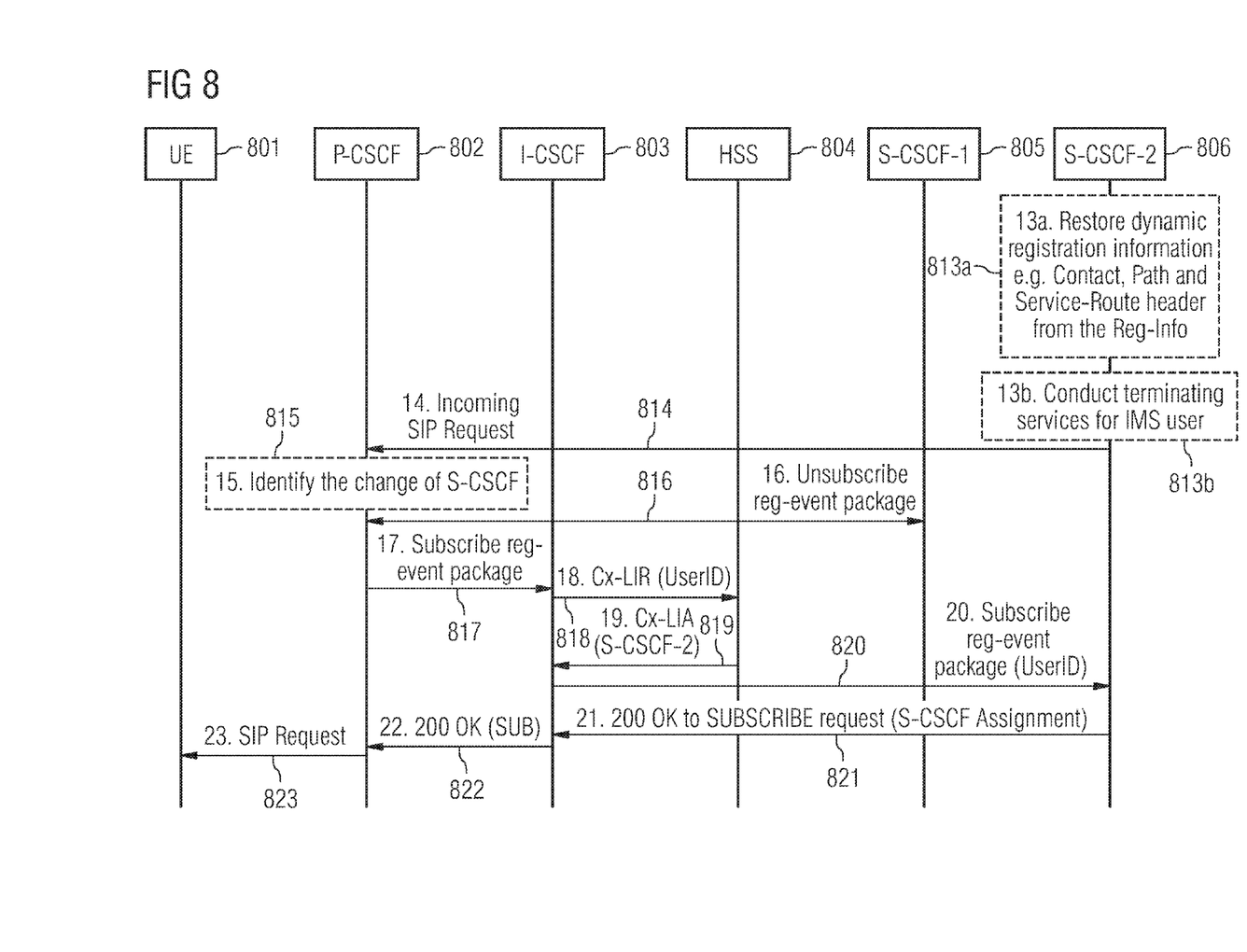

In FIG. 8, 813*a* indicates that dynamic registration information is restored and 813*b* indicates terminating services for the IMS is conducted. The S-CSCF-2 806 sends an incoming SIP request 814 to the P-CSCF 802. 815 indicates the change of the S-CSCF is identified and an unsubscribe Reg-Event package 816 is initiated between the P-CSCF 802 and the S-CSCF-1 805. The P-CSCF 802 sends a subscribe Reg-Event package 817 to the I-CSCF 803, which in turn sends a Cx-LIR(UserID) message 818 to the HSS 804. The HSS 804 sends an Cx-LIA(S-CSCF-2) message 819 to the I-CSCF 803, which in turn sends a subscribe Reg-Event package (UserID) message 820 to the S-CSCF 806. The S-CSCF-2 806 sends an OK to subscribe request message 821 to the I-CSCF 803, which in turn sends an OK (SUB) message 822 to the P-CSCF 802. Then the P-CSCF 802 sends the SIP request 823 to the UE.

The invention claimed is:

1. A method for re-assigning Serving Call Session Control Function (S-CSCF) services to a user of a Home Subscriber Server (HSS), in a telecommunications network, the method comprising:
   i) assigning a first S-CSCF to the user during an internet protocol multimedia subsystem (IMS) registration procedure;
   ii) uploading dynamic registration information from the first S-CSCF to the HSS during the IMS registration procedure, wherein the dynamic registration information comprises information created during the IMS registration procedure;
   iii) storing the dynamic registration information in the HSS; and
   iv) downloading the stored dynamic registration information from the HSS to a second S-CSCF during a S-CSCF re-assignment procedure for the user;
   wherein the dynamic registration information comprises at least one of a binding address, a binding duration, a path header value, Expires header, Contact header.

2. The method of claim 1, further comprising providing re-assignment information to a Proxy Call Session Control Function (P-CSCF), which acts as an outbound proxy for an internet protocol multimedia subsystem (IMS) terminal.

3. The method of claim 2, wherein the providing the S-CSCF assignment information to the P-CSCF via extended procedure for the subscription of a Reg Event package further comprises sending by the P-CSCF a SIP SUBSCRIBE request to an I-CSCF which then forwards the SIP SUBSCRIBE request to the newly selected S-CSCF, providing by the S-CSCF-2 the S-CSCF assignment information to the P-CSCF updating by the P-CSCF the stored S-CSCF assignment information, which the P-CSCF uses to connect the IMS user with the newly assigned S-CSCF-2.

4. The method of claim 1, wherein the uploading dynamic registration information to the HSS is performed via Server Assignment Request/Server Assignment Answer (Cx-SAR/SAA) operation, which automatically includes the dynamic registration information in the Server Assignment request.

5. The method of claim 4, wherein every new Cx-SAR request triggers the dynamic registration information stored at the HSS to be updated.

6. The method of claim 5, wherein if no dynamic registration information is contained in the Cx-SAR request, previously stored dynamic registration at the HSS is deleted.

7. The method of claim 1, wherein said S-CSCF reassignment for registered IMS users via a Cx-SAR/SAA operation comprises, when the second S-CSCF is selected and receives a non-REGISTER request for an unknown IMS user, the second S-CSCF treats the user as an unregistered user and downloads a user profile from the HSS via the Cx-SAR operation.

8. The method of claim 7, wherein the HSS checks whether the registration status of the IMS user at the HSS is "registered", and when the user is registered, but in the Cx-SAR request the IMS user is marked as "unregistered", the HSS recognizes the inconsistency between the HSS and the S-CSCF about the registration status of the IMS user.

9. The method of claim 8, wherein the HSS checks whether the dynamic registration information is stored at the HSS for the IMS user, if it is the case that the dynamic registration information is stored at the HSS for the IMS user, the HSS further treat the IMS user as "registered" and provide the stored registration information to the S-CSCF in the Cx-SAA operation, together with a user profile.

10. The method of claim 9, wherein if it is not the case that dynamic registration information is stored at the HSS for the user, the HSS treat the user as "unregistered" and only provides the user profile to the S-CSCF, and when the S-CSCF receives the dynamic registration information from the HSS, S-CSCF knows that the user was already registered in IMS, the S-CSCF treat the IMS user as "registered" and build information for serving the registered IMS user from the received dynamic registration information.

11. A Home Subscriber Server (HSS), in an Internet Protocol (IP), Multimedia subsystem (IMS), comprising:
   a receiver configured to receive dynamic registration information from a first Serving Call Session Control Function (S-CSCF), during an IMS registration procedure of a user, wherein the dynamic registration information comprises information created during the IMS registration procedure;
   storage configured to store the dynamic registration information;
   the receiver configured to receive a request from a second Serving Call Session Control Function (S-CSCF), requesting a user profile for the user;
   a transmitter configured to transmit, responsive to receiving the request, the dynamic registration information to the second Serving Call Session Control Function (S-CSCF);
   wherein the dynamic registration information comprises at least one of a binding address, a binding duration, a path header value, Expires header, Contact header.

12. The Home Subscriber Server (HSS), of claim 11, wherein the transmitter is configured to transmit the dynamic registration information to the second Serving Call Session Control Function (S-CSCF), only if following conditions are met:
   registration status of the user according to the Home Subscriber Server, HSS, database indicates that the user is registered, and
   in the received request the user is marked as unregistered.

13. The Home Subscriber Server (HSS), of claim 11, further configured to update the stored dynamic registration information if updated dynamic registration information is received from the first Serving Call Session Control Function (S-CSCF), during the registration procedure of the user.

14. The Home Subscriber Server (HSS), of claim 11, further configured to delete the stored dynamic registration information if no dynamic registration information is received from the first Serving Call Session Control Function (S-CSCF), during the registration procedure of the user.

* * * * *